(12) United States Patent
Flotats Molinas

(10) Patent No.: US 10,881,128 B2
(45) Date of Patent: Jan. 5, 2021

(54) AUTOMATIC SQUEEZER WITH THE ENTIRE SQUEEZING UNIT INTERCONNECTED BY A SUPPORT INDEPENDENT OF THE DRIVE UNIT

(71) Applicant: ZUMEX GROUP, S.A., Moncada (ES)

(72) Inventor: Antonio Flotats Molinas, Moncada (ES)

(73) Assignee: ZUMEX GROUP, S.A., Moncada (ES)

( * ) Notice: Subject to any disclaimer, the term of this patent is extended or adjusted under 35 U.S.C. 154(b) by 156 days.

(21) Appl. No.: 15/519,210

(22) PCT Filed: Oct. 15, 2015

(86) PCT No.: PCT/EP2015/073948
§ 371 (c)(1),
(2) Date: Apr. 14, 2017

(87) PCT Pub. No.: WO2016/059186
PCT Pub. Date: Apr. 21, 2016

(65) Prior Publication Data
US 2017/0224002 A1 Aug. 10, 2017

(30) Foreign Application Priority Data
Oct. 17, 2014 (ES) .................................. 201431535

(51) Int. Cl.
*A23N 1/00* (2006.01)
*A47J 19/02* (2006.01)
*A23N 1/02* (2006.01)

(52) U.S. Cl.
CPC ............... *A23N 1/003* (2013.01); *A23N 1/02* (2013.01); *A47J 19/023* (2018.08); *A23N 1/00* (2013.01); *A47J 19/02* (2013.01)

(58) Field of Classification Search
None
See application file for complete search history.

(56) References Cited

U.S. PATENT DOCUMENTS 2,723,618 A * 11/1955 Matthews ............... A23N 1/003
100/130
5,170,699 A * 12/1992 Senalada ................. A23N 1/003
99/504

(Continued)

FOREIGN PATENT DOCUMENTS

| BE | 713716 | 9/1968 |
| ES | 2475147 | 10/2014 |

(Continued)

OTHER PUBLICATIONS

International Search Report dated Feb. 23, 2016 issued in connection with PCT/EP2015/073948; 2 pages.

*Primary Examiner* — Ibrahime A Abraham
*Assistant Examiner* — Elizabeth M Sims
(74) *Attorney, Agent, or Firm* — Vedder Price P.C.

(57) ABSTRACT

The invention relates to a squeezing machine of the type in which the juice is obtained in a squeezing unit comprising at least one male drum (5) and at least one female drum, the female drum (4) having recesses for holding the fruit and the male drum having protrusions that insert in the recesses of the female drum to catch the fruit, the squeezing unit (2) and other auxiliary elements are joined to each other, preferably by a casing, such that they can engage and be released from the drive element (1) as a single block.

9 Claims, 4 Drawing Sheets

(56) References Cited

U.S. PATENT DOCUMENTS

| | | | | |
|---|---|---|---|---|
| 5,182,984 | A | * | 2/1993 | Wagner .................. A23N 1/003 100/108 |
| 7,493,851 | B2 | * | 2/2009 | Mengual ................ A23N 1/003 99/501 |
| 2012/0024172 | A1 | * | 2/2012 | Pichler ................... A23N 1/003 100/96 |

FOREIGN PATENT DOCUMENTS

| | | | | |
|---|---|---|---|---|
| WO | WO-02096226 | A1 | * 12/2002 | ............. A23N 1/003 |
| WO | WO-2004052126 | A1 | * 6/2004 | ............... A23N 1/02 |

* cited by examiner

AUTOMATIC SQUEEZER WITH THE ENTIRE SQUEEZING UNIT INTERCONNECTED BY A SUPPORT INDEPENDENT OF THE DRIVE UNIT

This application is a national phase application that claims the benefit of and priority from International Application No. PCT/EP2015/073948, filed Oct. 15, 2015, which claims the benefit of and priority from Spain Application No. P201431535, filed Oct. 17, 2014, both of which are wholly incorporated herein by reference.

As indicated by its title, the invention relates to an automatic squeezer of the type in which the juice is obtained in a squeezing unit generally comprising one or more male drums and one or more female drums driven by a drive module, generally adjacent, where the female drums include recesses in which to house the fruit or vegetable or part thereof and carry it to one of the protrusions of the male drum that is inserted in said recess to perform the squeezing, where the elements of the squeezing unit are interconnected with each other forming a block from which the individual squeezing elements can be removed.

This squeezing module engages a second module, the drive module, such that the motion of the drive module is transmitted to the squeezing module.

The essential feature of the invention disclosed herein is that the squeezing module elements are interconnected such that the module can be separated as a block from the drive module.

The corresponding field of the art is that of machines for preparing drinks.

BACKGROUND

Automatic squeezers comprising drive elements that engage squeezing elements have been known for a long time.

Due to the characteristics of juice, particularly citrus fruit juice, these machines require frequent cleaning and care to prevent malfunctions as well as for hygiene reasons.

Thus, the various individual elements forming the squeezing unit must be removed from the machine for thorough cleaning. To simplify the task of removing the various individual elements of the squeezing unit, elements have been conceived with wing nuts that attach one or all of the various individual elements of the squeezing unit, which allow a short nut turn to secure or release the drums from the corresponding shafts individually or jointly, allowing the simple removal thereof.

However, these elements DO NOT support the various individual elements nor the assembly of the various individual elements. This requires performing the assembly and removal operations of each individual drum independently.

It is the case of the patent BE713716.

To solve the aforementioned problem, patent ES2389890T3 describes an extraction lock comprising an element that acts as a stop for the squeezing drums, where said stop is removably attached directly to the frame.

Said patent simplifies the attachment and releasing tasks, as the same element provides a stop for all drums such that when said element is attached, all the drums are secured, and when removed all drums are released and can be removed.

However, it is still necessary to assemble and remove each drum individually, which hinders and slows down the cleaning operations and can lead to losing drums.

Patent ES2475147 (also known as US2012/024172) relates to a squeezing machine of those comprising male and female drums, where in order to simplify the cleaning tasks a removable wall is provided to separate the squeezing area from the machine frame. This removable wall coinciding with the squeezing area prevents the frame from getting dirty.

However, the problem of the complex assembly and removal operations is not solved, since as indicated in the specification the cleaning operations require first removing the case and collector tray from the frame before removing the press rollers and the heads of the punch, as well as the sliding guide for the fruits cut in half and the scraper elements can be removed after being separated from the support. Next the rear wall can be separated from the axles with the guide and spool for the blade, such that the spool can be moved outwards from the guide. The operation is performed in the inverse order to assemble the cleaned parts.

The invention of the present invention intends to prevent the assembly and removal of each part separately, proposing a squeezing unit in which at least the main elements thereof are interconnected such that they can all be assembled and removed as a block.

DESCRIPTION OF THE INVENTION

To overcome the aforementioned drawbacks and allow a simple assembly and removal of the individual elements of the squeezing unit for cleaning thereof, the invention proposed relates to an improved squeezing machine comprising two independent modules related by at least a transmission or gearing.

Module 1 comprises the drive elements, and can also comprise other auxiliary elements such as electric, electronic, transmission or gearing elements, among others.

Module 2 comprises a support to which are connected, preferably in a removable manner, at least the various individual elements of the squeezing group, namely the male and female drums, such that the support allows at least one rotational degree of freedom in said elements.

Modules 1 and 2 are engaged such that the movement of module 1 is transmitted to module 2.

In addition, module 2 can comprise auxiliary squeezing elements such as a blade, guide means for the fruit or vegetable, elements for ejecting the skin, a turning element, a cover, filters, vats, skin extraction ducts, fruit or vegetable feeder, a spigot or others.

In a preferred embodiment, module 2 comprises a support in the form of a lateral or enveloping casing, this casing being the supporting element that interconnects the various individual elements of the squeezing unit and facilitates handling them as a block.

The invention as described allows a simple, quick and complete separation of the entire squeezing module from the drive module, which greatly simplifies cleaning tasks and therefore greatly improves health and hygiene conditions.

In addition to the connection transmitting the movement from the drive module to the squeezing module, the two modules can be joined by auxiliary connections such as locks and closures to prevent the accidental separation of the modules, electrical connections for disconnecting the drive module when separated from the squeezing unit, or of any other type meant to increase the safety of use of the machine.

DESCRIPTION OF AN EMBODIMENT OF THE INVENTION

Figure 1:
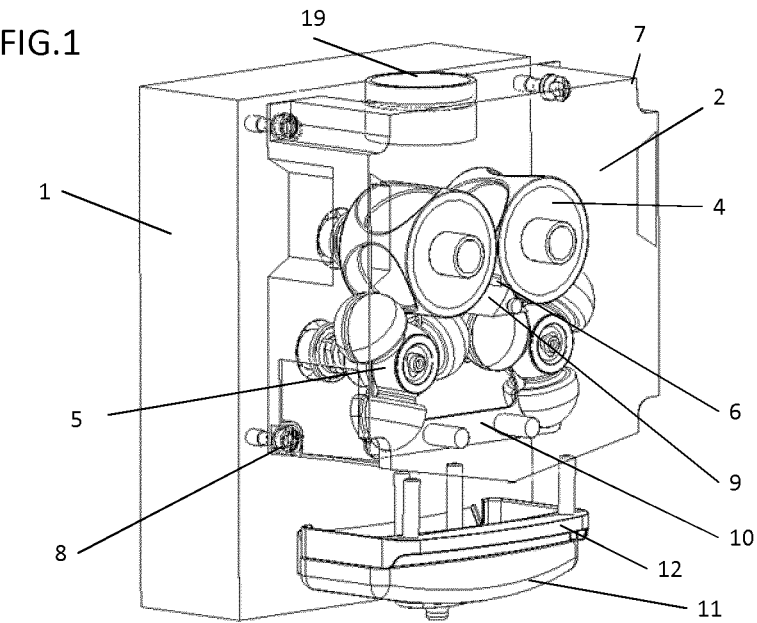
FIG. 1 shows the drive module 1 (1) and the squeezing module 2 (2) engaged to each other, also showing the rotary female drums (4) and male drums (5). Also visible is the casing (7) that contains the various individual elements of the squeezing unit, as well as the safety elements (8). Also visible are other auxiliary elements such as the blade (6), the guide (9), the skin extractor (10), vat (11), filter (12) and fruit feeder (19).
Figure 2:
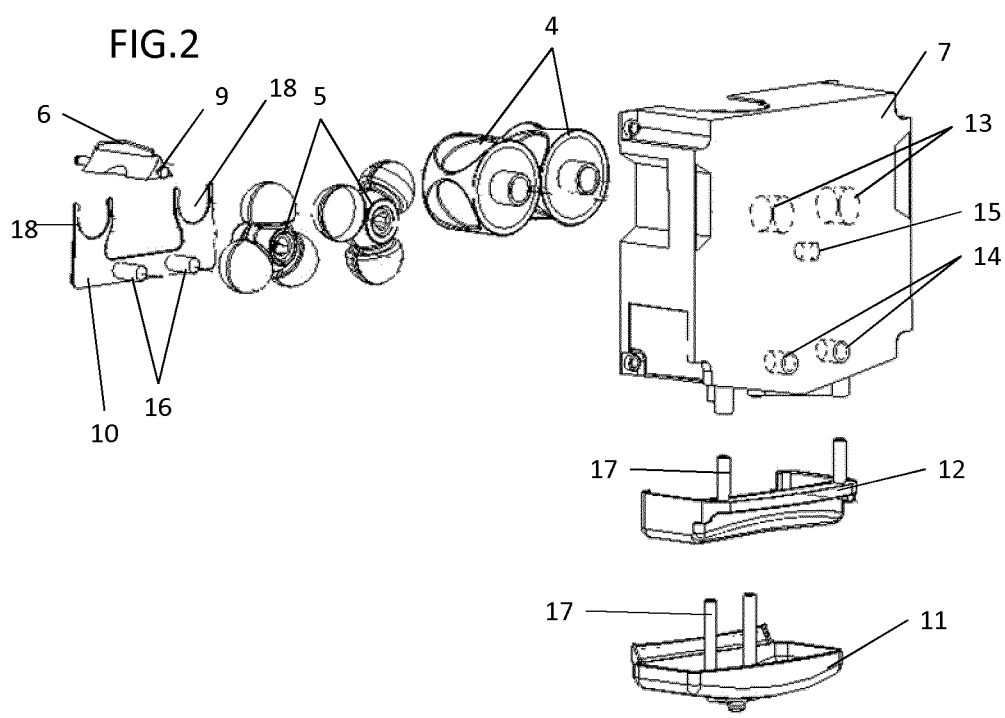
FIG. 2 is an exploded view of the squeezing module (2) showing the casing (7) that comprises the bearings (13) which support an on which revolve the female drums (4), the housings (14) for the lugs (16) of the skin extractor (10) with arms (18) that act as bearings for the male drums (5). The casing (7) also comprises the housing (15) for the guide (9), which in turn supports the blade (6). Also shown are the filter (12) and the vat (11), where the vat and filter are attached to the casing by a set of lugs (17).
Figure 3:
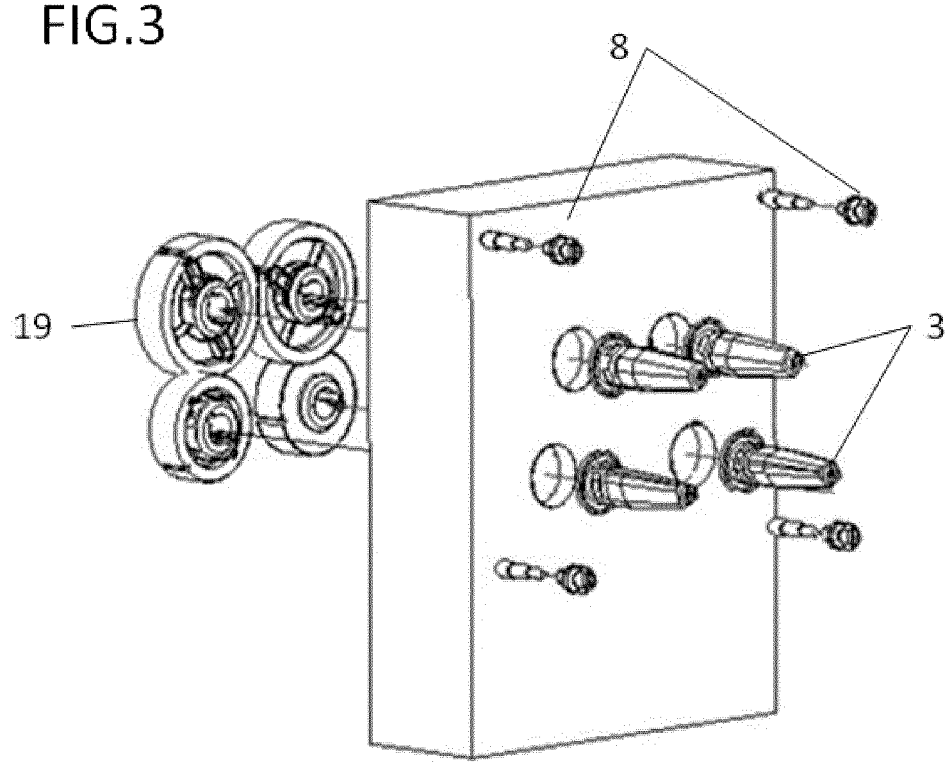
FIG. 3 shows an exploded view of the drive module 1 revealing the top and bottom drive shafts (3) which convey the rotation movement respectively to the female and male drums, not shown here. Also shown are the gears that enable the synchronised movement of all the shafts and the safety element (8) for attaching the modules.
Figure 4:
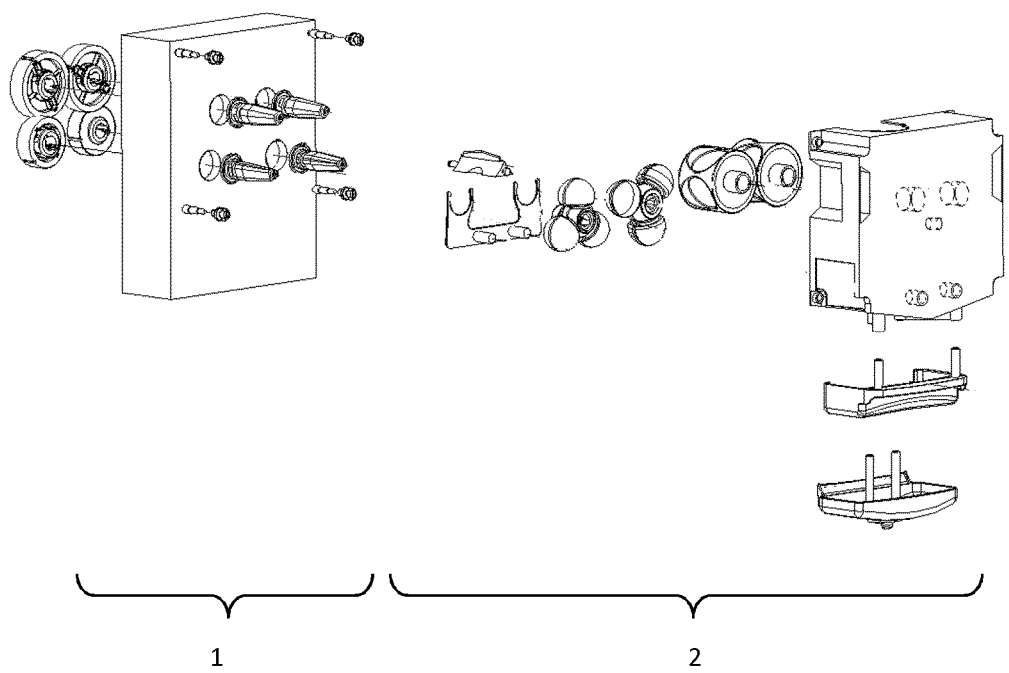
FIG. 4 shows an exploded view of the drive module 1 (1) and the squeezing module 2 (2) in the engaged position.

To aid the understanding of the invention, a description is made of an embodiment for purposes of illustration only and in a non-limiting sense, as other embodiments are possible.

The invention relates to an automatic squeezing machine of the type in which the squeezing occurs in a squeezing unit generally comprising one or more male drums and one or more female drums driven by a drive module which, using transmission means, in this case the shafts (3), transmits the movement from the drive module to the squeezing module, specifically to the male (5) and female (4) drums.

As indicated in the preceding paragraph, the invention comprises:

1. A drive module, the module 1 (1), comprising the drive elements, the gears and the movement transmission elements, which in this case are shafts (3) with a suitable shape for being inserted in the module 2 (2), specifically in the male (5) and female (4) drums. This drive module is attached to the frame of the machine.
2. A squeezing module, module 2 (2), comprising:
   a. The squeezing unit, in this case the female drums (4) and the male drums (5). Auxiliary elements such as the blade (6), the guide (9) and the skin extractor (10).
   b. A casing used for support and connection to the various individual elements of the squeezing unit, which allows at least one rotational degree of freedom to the drums.

The two modules are engaged through the shafts (3) such that when inserted in and engaging the male (5) and female (4) drums, the shafts (3) transmit the movement generated by the drive module (1) to the squeezing module (2).

Module 1 (1) comprises the mechanics and electronics, such that module 2 (2) is limited to specific squeezing elements, often made of plastic, which can be washed without risk of damage.

The squeezing module 2 (2) is connected to module 1 such that it can be disengaged from module 1 (1) as a block, thereby facilitating and streamlining the removal and assembly operations for washing, particularly since the squeezing module 2 (2) can be also washed as a block.

The various elements of module 2 (2) are interconnected with each other, although in this specific embodiment the elements can also be removed independently of module 2 (2) for a more thorough washing, specific maintenance operations or removing or repairing parts.

The casing has two functions: interconnecting the squeezing module 2 (2) acting as a support for the various elements thereof and containing them as a cover.

The female drums (4) are joined in the casing (7) by the bearings, which maintain them in position while allowing them to rotate.

The male drums (5) are mounted on the shafts (3) and rest on the arms (18) of the skin extractor (10) that act as a bearing from the male drums.

The skin extractor (10) is joined to the casing (7) by lugs (16) that are inserted in housings (14) made in the casing (7).

The blade (6) is mounted on a guide (9) that can be inserted in a housing (15) provided in the casing (7).

The filter (12) and the vat (11) are attached to the casing by a set of lugs (17).

In this way, all the elements of the squeezing unit and the auxiliary elements thereof are attached to the casing (7).

To ensure the correct attachment and engagement of the modules and to maintain the correct engagement thereof during the operation of the machine, safety elements (8) are provided that can include electronic systems that turn off the machine if the relative position of the modules is changed to ensure safety.

The invention claimed is:

1. An AUTOMATIC SQUEEZING MACHINE comprising:
    a drive module and a squeezing module,
    wherein the drive module includes a motor, a transmission connected to the motor and a plurality of drive shafts connected to the transmission,
    wherein the squeezing module includes a casing, at least one male drum rotatably connected to the casing and at least one female drum directly rotatably connected to the casing,
    wherein the at least one male drum and the at least one female drum are disposed for respective synchronised rotational movement,
    wherein the squeezing module, as a single block, is removably connected to the drive module, and
    wherein when the squeezing module is connected to the drive module each drive shaft engages one of the at least one male drum and one of the at least one female drum so that movement of the drive shafts is transmitted to the at least one male drum and the at least one female drum.

2. The AUTOMATIC SQUEEZING MACHINE according to claim 1, wherein the squeezing module further comprises an auxiliary element selected from the group consisting of: blade, guide, skin extractors, filter, vat, turner, skin extraction ducts, fruit or vegetable feeder, or spigot.

3. The AUTOMATIC SQUEEZING MACHINE according to claim 2, wherein the auxiliary element is connected to the casing.

4. The AUTOMATIC SQUEEZING MACHINE according to claim 3, wherein the at least one male drum and the at least one female drum are removably connected to the casing.

5. The AUTOMATIC SQUEEZING MACHINE according to claim 1, wherein the at least one male drum and the at least one female drum are removably connected to the casing.

6. The AUTOMATIC SQUEEZING MACHINE according to claim 1, wherein each drive shaft is received within one of the at least one male drum and the at least one female drum.

7. The AUTOMATIC SQUEEZING MACHINE according to claim 1, further comprises fasteners that secure and attach the drive module to the squeezing module.

8. The AUTOMATIC SQUEEZING MACHINE according to claim 1, wherein the at least one female drum is directly rotatably connected to the casing via a bearing.

9. The AUTOMATIC SQUEEZING MACHINE according to claim 1, wherein the at least one male drum is rotatably connected to the casing via a skin extractor.

* * * * *